(12) United States Patent
Kirillov et al.

(10) Patent No.: US 12,124,076 B2
(45) Date of Patent: Oct. 22, 2024

(54) CASCADED EYEBOX EXPANSION IN EXTENDED REALITY IMAGE PROJECTION DEVICES

(71) Applicant: Infineon Technologies AG, Neubiberg (DE)

(72) Inventors: Boris Kirillov, Judendorf-Straßenge (AT); Maksym Sladkov, Graz (AT)

(73) Assignee: Infineon Technologies AG, Neubiberg (DE)

( * ) Notice: Subject to any disclaimer, the term of this patent is extended or adjusted under 35 U.S.C. 154(b) by 331 days.

(21) Appl. No.: 17/361,667

(22) Filed: Jun. 29, 2021

(65) Prior Publication Data
US 2022/0413207 A1    Dec. 29, 2022

(51) Int. Cl.
*F21V 8/00*      (2006.01)
*G02B 26/08*    (2006.01)
*G02B 26/10*    (2006.01)
*G02B 27/01*    (2006.01)

(52) U.S. Cl.
CPC ......... *G02B 6/0076* (2013.01); *G02B 6/0028* (2013.01); *G02B 6/0031* (2013.01); *G02B 26/0833* (2013.01); *G02B 26/101* (2013.01); *G02B 27/0172* (2013.01); *G02B 2027/0112* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 2007/0024549 A1* | 2/2007 | Choi | B81B 7/0067 345/84 |
| 2010/0177388 A1* | 7/2010 | Cohen | G02B 6/0038 359/566 |
| 2011/0019250 A1* | 1/2011 | Aiki | G02B 5/32 359/861 |
| 2013/0222919 A1* | 8/2013 | Komatsu | G02B 27/0172 359/630 |
| 2017/0131552 A1* | 5/2017 | Yokoyama | G02B 5/1866 |
| 2017/0235144 A1* | 8/2017 | Piskunov | G02B 5/18 359/13 |

(Continued)

FOREIGN PATENT DOCUMENTS

WO    2014077032 A1    5/2014
WO    2020256801 A1    12/2020

*Primary Examiner* — Shan Liu
(74) *Attorney, Agent, or Firm* — Harrity & Harrity, LLP (57) ABSTRACT

An image projection system includes a cascaded waveguide system including a first waveguide and a second waveguide arranged downstream along a transmission path from the first waveguide. The first waveguide includes a first output structure and is configured to receive a light beam having a first beam width and output a first expanded light beam at the first output structure, wherein the first expanded light beam has a second beam width greater than the first beam width. The second waveguide includes a second output structure and is configured to receive the first expanded light beam from the first waveguide and output the first expanded light beam multiple times from the second output structure as a plurality of output light beams. Each of the plurality of output light beams is output from a different area of the second output structure along a propagation direction of the second waveguide.

22 Claims, 4 Drawing Sheets

(56) References Cited

U.S. PATENT DOCUMENTS

| | | |
|---|---|---|
| 2017/0285348 A1 | 10/2017 | Ayres et al. |
| 2019/0049738 A1 | 2/2019 | Shi |
| 2021/0141230 A1* | 5/2021 | Shih .................. G02B 27/0172 |
| 2022/0197034 A1* | 6/2022 | Noui .................. G02B 27/0172 |
| 2022/0269079 A1* | 8/2022 | Adema ................ G02B 26/105 |

* cited by examiner

CASCADED EYEBOX EXPANSION IN EXTENDED REALITY IMAGE PROJECTION DEVICES

BACKGROUND

Augmented reality (AR) is a technology that augments physical environments on a mobile device screen by overlaying them with digital content. It adds digital elements to a live view. For example, a captured piece of an environment is augmented with digital information that is superimposed thereon. Thus, digital content is overlaid onto the captured piece of the environment to visually provide additional information to a user. The digital content may be displayed on a transparent substrate or display, such as smart eyeglasses, smart contact lenses, head-up displays (HUDs), and head-mounted displays (HMDs), or projected directly onto a user's retina, as is the case for virtual retinal displays.

Virtual reality (VR) is a technology that entirely replaces the real world environment of a user with a computer-generated virtual environment. Thus, a user is presented with a completely digital environment. In particular, computer-generated stereo visuals entirely surround the user. In a VR simulated environment, a VR headset that provides 360 degree vision may be used.

A mixed reality (MR) experience combines elements of both AR and VR such that real-world and digital objects interact. Here, a real world environment is blended with a virtual one.

These technologies, as well as others that enhance a user's senses, may be referred to as extended reality (XR) technologies.

There are several technologies that are enabling these products. A microelectromechanical system (MEMS) mirror-based laser beam scanner (LBS) is one of them. The laser beam scanner is capable of delivering small form factor, low power consumption, and high brightness at a relatively low system cost. The combination of LBS technology for picture generation and waveguide technology for picture delivery is the most popular technical solution in the field. However, there are several challenges associated with MEMS mirror-based LBS in such products. Producing acceptable image quality and field-of-view is a top-level requirement to such products that can be broken down into requirements to sub-systems and components. In particular, for a MEMS mirror-based LBS display, one of the important requirements is to provide large enough output beam size but keep the entire system small.

Output beam size of a MEMS mirror-based LBS picture generation unit or light engine is defined and constrained by the MEMS mirror size which cannot be too large due to fundamental mechanical limitations of silicon material. Another argument against increasing the MEMS mirror size is the system requirement to keep the system size small. Accordingly, there is a strong need for a technical solution that allows to increase the beam size coming out of the light engine without affecting the entire system size too much.

In order to address one or more of the above issues, it may be beneficial to implement cascaded waveguides in an XR projection device for beam expansion.

SUMMARY

One or more embodiments provide an image projection system that includes a transmitter configured to generate a light beam having a first beam width and transmit the light beam along a transmission path to be projected onto an eye to render a projection image thereon; a scanner arranged on the transmission path, the scanner configured to receive the light beam and steer the light beam according to a scanning pattern to render the projection image onto the eye; and a cascaded waveguide system including a plurality of waveguides arranged sequentially along the transmission path, the plurality of waveguides including a first waveguide and a second waveguide arranged downstream along the transmission path from the first waveguide. The first waveguide includes a first output structure and is configured to receive the light beam from the scanner and output a first expanded light beam at the first output structure, wherein the first expanded light beam has a second beam width greater than the first beam width. The second waveguide includes a second output structure and is configured to receive the first expanded light beam from the first waveguide and output the first expanded light beam multiple times from the second output structure as a plurality of output light beams, wherein each of the plurality of output light beams is output from a different area of the second output structure along a propagation direction of the second waveguide.

One or more embodiments provide a wearable extended reality image projection system that includes a transmitter configured to generate a light beam having a first beam width and transmit the light beam along a transmission path to be projected onto an eye to render a projection image thereon; a scanner arranged on the transmission path, the scanner configured to receive the light beam and steer the light beam according to a scanning pattern to render the projection image onto the eye; and a cascaded waveguide system including a plurality of waveguides arranged sequentially along the transmission path, the plurality of waveguides including a first waveguide and a second waveguide arranged downstream along the transmission path from the first waveguide. The first waveguide includes a first output structure and is configured to receive the light beam from the scanner and output a first expanded light beam at the first output structure, wherein the first expanded light beam has a second beam width greater than the first beam width. The second waveguide includes a second output structure and is configured to receive the first expanded light beam from the first waveguide and output the first expanded light beam multiple times from the second output structure as a plurality of output light beams, wherein each of the plurality of output light beams is output from a different area of the second output structure along a propagation direction of the second waveguide.

BRIEF DESCRIPTION OF THE DRAWINGS

Embodiments are described herein making reference to the appended drawings.

DETAILED DESCRIPTION

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

The term "substantially" may be used herein to account for small manufacturing tolerances (e.g., within 5%) that are deemed acceptable in the industry without departing from the aspects of the embodiments described herein.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments are directed to using a cascaded waveguide for beam expansion in a wearable XR light image projection device. The XR light projection device uses a light engine to generate an RGB projection comprising combined red (R), green (G), and blue (B) light beams (i.e., a combined RGB light beam) having an output beam width. A microelectromechanical system (MEMS) mirror is implemented as a laser beam scanner for steering RGB light received from the light engine according to a scanning pattern to render images onto the retina of an eye. However, before projected onto the eye, the steered RGB light is transmitted through a cascaded waveguide that expands the beam width of the steered RGB light and guides the expanded RGB light towards the eye. The expanded RGB light is output from the cascaded waveguide and finally projected onto the eye according to the scanning pattern implemented by the MEMS mirror.

The first waveguide in the cascaded waveguide can be thin because it does not have to be used as a combiner glass. However, the same technology and design process can be utilized for producing both waveguides in the cascade which is cost effective. Another advantage is that this solution has near zero impact on the system size.

Figure 1A:
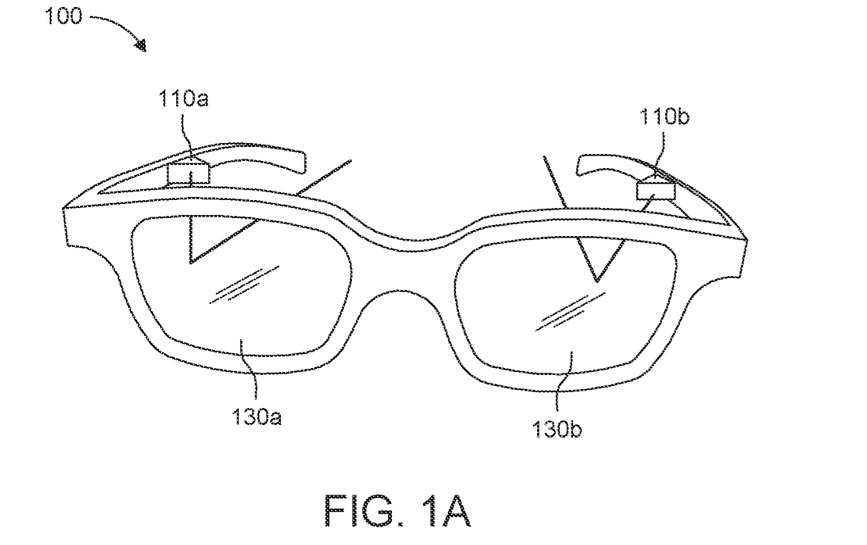
FIG. 1A is a diagram of an image projection system in accordance with one or more embodiments.

FIG. 1A is a diagram of an image projection system 100 in accordance with one or more embodiments. The image projection system 100 comprises at least one projection module that projects images in one or more (virtual) projection planes according to a scanning pattern. In particular, visible light (VL) projections, such as red-green-blue (RGB) projections, are projected onto an eye according to a preprogrammed scanning pattern (e.g., a raster or a Lissajous pattern), where RGB light pulses track the pattern.

A projection module may be provided for each eye for projecting stereo images comprising a left-eye image and a right-eye image. Thus, in this example, two projection modules 110a and 110b are provided. Each image projection module 100a, 100b includes a light engine comprising red (R), green (G), and blue (B) monochromatic light sources (e.g., laser diodes or light emitting diodes). Each image projection module 100a, 100b also includes a MEMS mirror that steers light according to a scanning pattern.

The image projection system 100 itself may be eyeglasses, but may be any other XR image projection system (e.g., HUD, HMD, etc.). The eyeglasses include a combiner glass 130a, 130b (e.g., eyeglass lenses) for each image projection module 110a, 110b, respectively, that receives transmitted light beams from a corresponding image projection module 110a, 110b and projects (e.g., deflects) the light beams onto a corresponding eye according to a virtual projection plane that corresponds to virtual distance at which the images are to be perceived.

A cascaded waveguide may be integrated fully within each of the combiner glasses 130a and 130b. For example, the combiner glasses 130a may include a first thin waveguide that receives RGB light from the image projection module 110a and a second, thicker waveguide that receives the RGB light from the first thin waveguide and subsequently outputs the RGB light towards an eye. The first thin waveguide is configured to expand the beam width of the RGB light received from the light engine and provide the expanded RGB light beam to the second, thicker waveguide. Accordingly, the first thin waveguide may be referred to as an eye box expander and the second, thicker waveguide may be referred to as a combiner waveguide. The same arrangement can be used for elements 110b and 130b.

Alternatively, the first thin waveguide may be integrated at the projection module 110a and the second, thicker waveguide may be integrated in the combiner glass 130a. The same arrangement can be used for elements 110b and 130b.

Figure 1B:
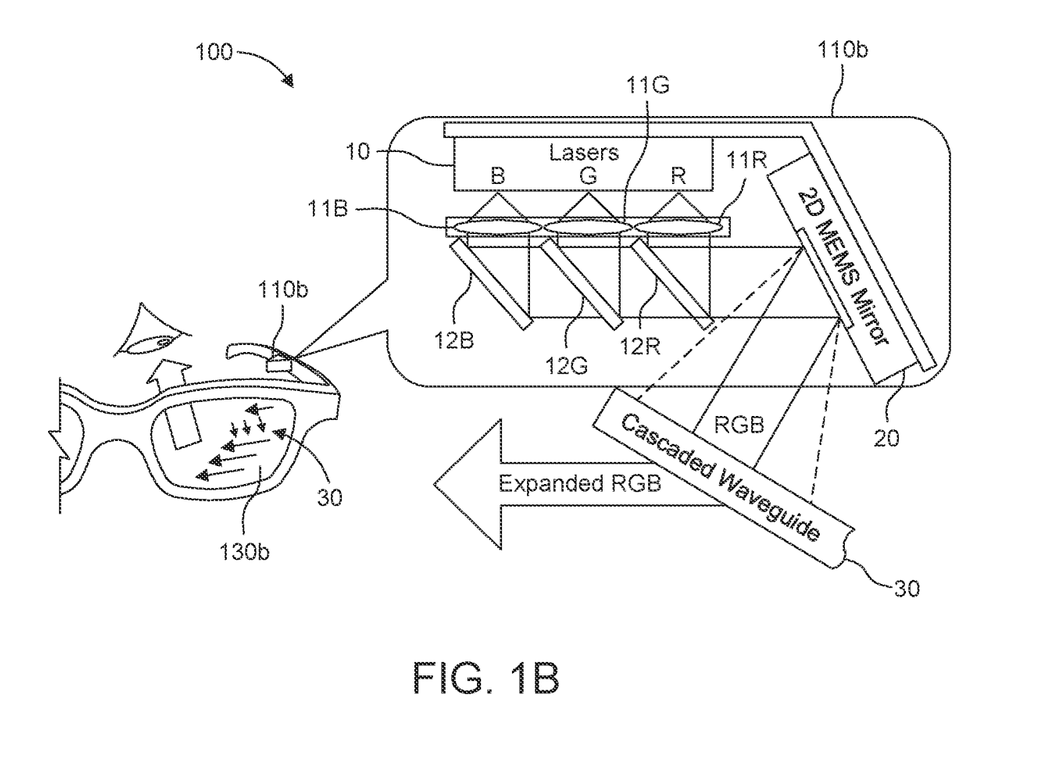
FIG. 1B is a schematic block diagram of the image projection system in accordance with one or more embodiments.

FIG. 1B is a schematic block diagram of the image projection system 100 in accordance with one or more embodiments. The image projection system 100 includes a light engine, a two-dimensional (2D) MEMS mirror 20, and a cascaded waveguide 30 comprising a plurality of waveguides arranged sequentially along a transmission path. The light engine includes an RGB light unit 10 (i.e., an RGB light beam transmitter) having plurality of light sources, including red (R), green (G), and blue (B) monochromatic light sources (e.g., laser diodes or light emitting diodes). The RGB light unit 10 is configured to generate red, green, and blue light beams in the visible light spectrum corresponding to image data to be projected onto the retina of a user's eye. The RGB light unit 10 is configured to transmit the red, green, and blue light beams towards the MEMS mirror 20 through the assistance of a relay optics system comprising collimation lenses 11B, 11G, and 11R and optical beam splitters 12B, 12G, and 12R included in the light engine.

Collimation lens 11B is a first beam collimator arranged downstream from the blue light source for receiving and collimating blue light beams. Collimation lens 11G is a second beam collimator arranged downstream from the green light source for receiving and collimating green light beams. Collimation lens 11R is a third beam collimator arranged downstream from the red light source for receiving and collimating red light beams. The collimation lenses 11B, 11G, and 11R generate collimated light beams to be projected onto an eye to render a projection image thereon.

The individual RGB light beams (i.e., the collimated red, green, and blue light beams) may be coupled into a combined transmission path via respective optical beam splitters 11R, 11G, and 11B that have a high reflectivity with to their respective RGB light beam. Together, the optical beam splitters 11R, 11G, and 11B for a beam combiner that combines the collimated red, green, and blue light beams into a combined RGB light beam having an RGB beam width.

The RGB light unit 10 may generate the red, green, and blue light beams as light pulses and the RGB light beam may be an RGB light pulse once the individual light pulses are combined. Each RGB light pulse may be representative of an image pixel of an RGB image. Each RGB light pulse may comprise any combination of a red light pulse, a green light pulse, and/or a blue light pulse emitted simultaneously, including one, two, or three colors in combination at controlled intensities according to the desired pixel hue of the respective image pixel. Accordingly, an RGB light pulse may be referred to as a pixel light pulse or an image light pulse or and a RGB light beam may be referred to as a pixel light beam or an image light beam.

While a relay optics system of collimation lenses and optical beam splitters is shown, it will be appreciated that other types of relay optics systems may be used for combining the red, green, and blue light beams into an RGB light beam and transmitting the RGB light beam along a combined transmission path towards the MEMS mirror 20.

The 2D MEMS mirror 20 represents a scanning system that is arranged along the combined transmission path and is configured to receive the RGB light beam from the relay optics system of the light engine. In this example, the scanning system is a 2D MEMS mirror, but it may also be formed by two one-dimensional (1D) MEMS mirrors that are sequentially arranged along the combined transmission path.

A MEMS mirror is a mechanical moving mirror (i.e., a MEMS micro-mirror) integrated on a semiconductor chip (not shown). The MEMS mirror 20 may be suspended by mechanical springs (e.g., torsion bars) or flexures and is configured to rotate about two axes, for example, an x-axis to perform horizontal scanning and a y-axis (i.e., orthogonal to the x-axis) to perform vertical scanning. Using two scanning axes, the MEMS mirror 20 is able to perform scanning in two-dimensions and may be used for raster or Lissajous scanning operations.

When using two 1D MEMS mirrors, one MEMS mirror may be configured to oscillate on an x-axis to perform horizontal scanning, whereas another MEMS mirror may be configured to oscillate on a y-axis (i.e., orthogonal to the x-axis) to perform vertical scanning. Due to this single axis of rotation, a MEMS mirror is referred to as a 1D MEMS mirror. Together, the two 1D MEMS mirrors are able to perform scanning in two-dimensions and may be used for 2D scanning operations.

The MEMS mirror 20 may be a resonator (i.e., a resonant MEMS mirror) configured to oscillate "side-to-side" about each scanning axis such that the light reflected from the MEMS mirror oscillates back and forth in a corresponding scanning direction (e.g., a horizontal scanning direction or a vertical scanning direction). A scanning period or an oscillation period is defined, for example, by one complete oscillation from a first edge of a field of view (e.g., first side) to a second edge of the field of view (e.g., second side) and then back again to the first edge. A mirror period of a MEMS mirror corresponds to a scanning period.

Thus, the field of view is scanned in both scanning directions by changing the angle $\theta x$ and $\theta y$ of the MEMS mirror 20 on its respective scanning axes. A particular scanning pattern may be realized by independently configuring an amplitude range (i.e., an angular range of motion) and a driving frequency with respect to a rotation about each axis. In addition, a shape of a driving waveform of the driving signal used to drive the MEMS mirror 20 about each scanning axis may be independently configured to further define the scanning pattern. For example, the driving waveforms may be sinusoidal for both scanning axes, or one may be sinusoidal and the other may be saw-toothed, etc.

Accordingly, the MEMS mirror 20 is arranged on the combined transmission path and is used to steer RGB light received therefrom according to the scanning pattern to render images onto the retina of the eye. The MEMS mirror 20 directs the RGB light further along the combined transmission path towards the cascaded waveguide 30, which then directs the RGB light at the eye for rendering images thereon. The cascaded waveguide 30 is responsible for expanding the beam width of the RGB beam output by the relay optics system and reflected by the MEMS mirror 20. The cascaded waveguide 30 is also responsible for projecting the RGB images into an eye of a user by directing the RGB images into the field of view of the user's eye. In other words, the cascaded waveguide 30 delivers RGB images generated by the RGB light units to the user's eye in accordance with a controlled scanning pattern.

FIGS. 2A-2D illustrate the image projection system 100 implementing different arrangements of cascaded waveguides according to one or more embodiments.

Figure 2A:
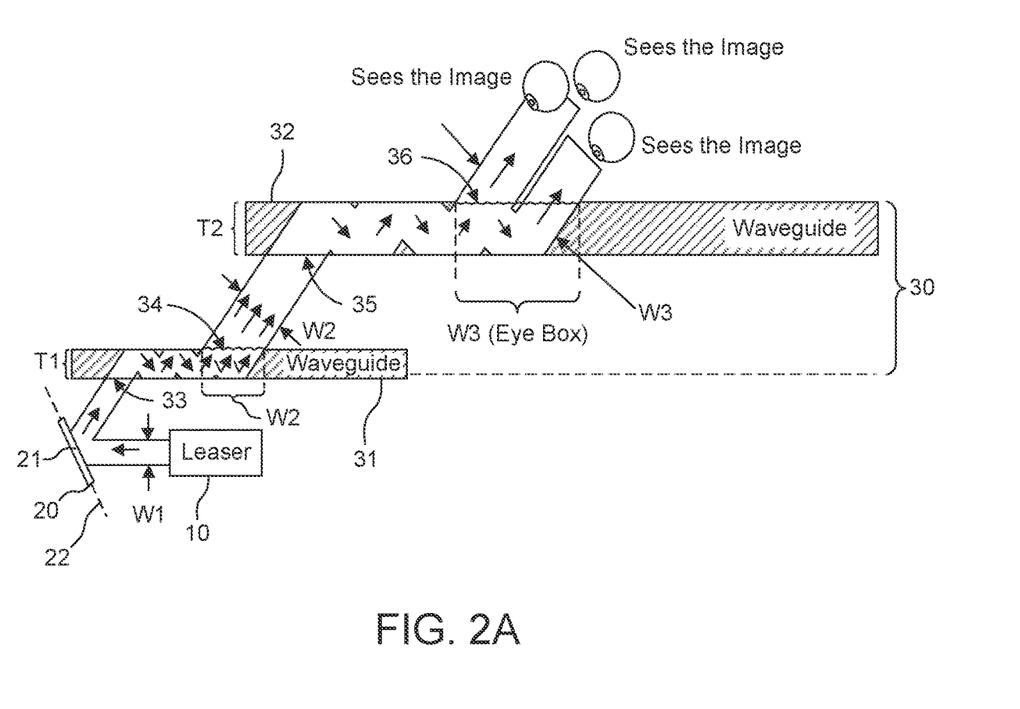
FIGS. 2A-2D illustrate the image projection system implementing different arrangements of cascaded waveguides of the image projection system according to one or more embodiments.

Specifically, FIG. 2A shows the RGB light unit 10 transmitting an RGB light beam towards the MEMS mirror 20 and the MEMS mirror 20 directing the RGB light beam towards the cascaded waveguide 30. The MEMS mirror 20 includes two orthogonal scanning axes 21 and 22 about which it rotates or oscillates to perform a scanning operation. The RGB light beam transmitted by the RGB light unit 10 has an initial beam width W1. The cascaded waveguide 30 includes a first waveguide 31 having a first thickness T1 and a second waveguide 32 having a second thickness T2 that is larger than the first thickness T1. The second waveguide 32 is arranged downstream along a transmission path from the first waveguide 31. The multiple waveguides perform a cascaded beam expansion of the RGB light beam transmitted from the RGB light unit 10.

The RGB light beam is coupled into an input 33 the first waveguide 31 and propagates within the first waveguide 31 via internal refraction along a transmission direction towards an output structure 34 of the first waveguide 31. The output structure 34 may be arranged at the waveguide surface opposite to that of its input (as shown) or at the same waveguide surface as that of its input. The output structure 34 is configured to couple the RGB light beam out of the first waveguide 31 towards the second waveguide 32. For example, the output structure 34 may be a transmission grating (e.g., a diffraction grating) having a width W2 that is greater than bream width W1. The output structure 34 is configured to expand the width of the initial RGB light beam to the substantially the same width of the output structure 34. As the RGB light beam propagates through the first waveguide 31, portions of the light will be coupled out by the output structure 34. Some portions may reflect back inward by the output structure 34, thereby propagating further along the first waveguide 31, and then be reflected back at the output structure 34 where they are coupled out. As a result, the RGB light beam is output in multiple instances or in multiple replications along the width of the output structure 34 (i.e., along its propagation dimension that corresponds to direction in which the light travels in the waveguide) in a way that it is divided into multiple overlapping or closely arranged beams that are combined while being output by the output structure 34 into a combined beam or the output beams are more closely arranged with respect to each other when compared to their initial spacing.

Each instance of the RGB light beam is output from a different surface area of the output structure 34 along the propagation direction of the waveguide 31 (i.e., along the width of the output structure 34). This output of multiple light beams from the output structure 34 occurs for a single RGB light beam (e.g., a single pulse) that is coupled into the waveguide 31 for a single 2D transmission coordinate of the 2D MEMS mirror 20. The multiple output beams are combined via beam overlapping at the output structure 34 with no gaps between these output portions, effectively outputting a combined larger beam as an expanded light beam. As the width W2 is greater than the initial beam width W1, the beam width of the RGB light beam is expanded to correspond to the width of the output structure 34.

It is noted that the thickness T1 of the first waveguide 31 is made such that as different portions of the RGB light beam are output along width of the output structure 34, there are no gaps in the expanded RGB light beam that is coupled out of the first waveguide 31. In other words, the multiple instances are output in such a way that they are overlapped/combined to form a signal expanded beam have width W2. This may occur when thickness T1 is less than the initial beam width W1. However, more generally, T1 is chosen such that with a given beam width W1 it results in closely arranged, touching, or overlapping output beams from the first waveguide 31. It is also noted that thickness T1 is less than the width W2 of the output structure 34. A gap in the expanded beam (i.e., between multiple output beams) would negatively affect the image quality by introducing gaps in the projected image. Therefore, the result is that the initial RGB beam is expanded by the first waveguide 31 without any degradation in image quality.

The expanded RGB light beam is coupled into an input 35 of the second waveguide 32 and propagates within the second waveguide 32 via internal refraction along a transmission direction towards an output structure 36 of the second waveguide 32.

The output structure 36 may be arranged at the waveguide surface opposite to that of its input (as shown) or at the same waveguide surface as that of its input. The output structure 36 is configured to couple the expanded RGB light beam out of the second waveguide 32 towards the eye which may be done with even further beam width expansion. For example, the output structure 36 may be a transmission grating (e.g., a diffraction grating) having a width W3 that is greater than the bream width W2. The width W3 of the output structure 36 defines a size of an eye box of the image projection system 100. The eye box is an area in which an eye may be present for receiving a projected image therefrom. Due to the beam expansion made by the first waveguide 31, the expanded RGB light beam fills the eye box with no or substantially no gaps. In other words, an eye may be located anywhere within the projection of the eye box and receive the projected image carried by the expanded RGB light beam.

Similar to the operation of output structure 34, the output structure 36 is configured to output the expanded RGB light beam in multiple instances or in multiple replications along its width W3. In other words, portions of the expanded RGB light beam are output multiple times by the output structure 36 as the expanded RGB light beam propagates along the second waveguide 32, including along the eye box. Each of the output light beams is output from a different surface area of the output structure 36 along the propagation direction of the waveguide 32 (i.e., along the width of the output structure 36). This output of multiple light beams from the output structure 36 occurs for a single RGB light beam (e.g., a single pulse) that is coupled into the waveguide 31 for a single 2D transmission coordinate of the 2D MEMS mirror 20.

The output structure 36 may expand the width of the expanded RGB light beam to the substantially the same width of the output structure 36 by combining/overlapping the multiple output beams into a single combined output beam. As the expanded RGB light beam propagates through the second waveguide 32, portions of the light will be coupled out by the output structure 36. Some portions may reflect back inward by the output structure 36, thereby propagating further along the second waveguide 32 (e.g., along the eye box), and then be reflected back at the output structure 36 where they are coupled out. As a result, the expanded RGB light beam is output in multiple instances along the width of the output structure 36 with even further width expansion possible. As the width W3 is greater than the first expended beam width W2, the beam width of the RGB light beam is may be expanded further to correspond to the width of the output structure 36.

Thus, the first waveguide 31 outputs a first expanded RGB light beam (i.e., a pre-expanded RGB light beam) and the second waveguide 32 may output a second expanded RGB light beam that fills the eye box of the second waveguide 32 with no or substantially no gaps. The pre-expanded RGB light beam may be output by the second waveguide 32 multiple times along the width output structure 36 with small gaps between the output RGB light beams. To the extent gaps between output RGB light beams are present, T2 and W3 are configured such that any gap is small enough that an eye may be located anywhere within the projection of the eye box and still receive the projected image carried by the pre-expanded RGB light beam. The cascaded waveguides provide a large enough output beam size to minimize gaps within the projection from the eye box while keeping the entire system small.

Figure 2B:
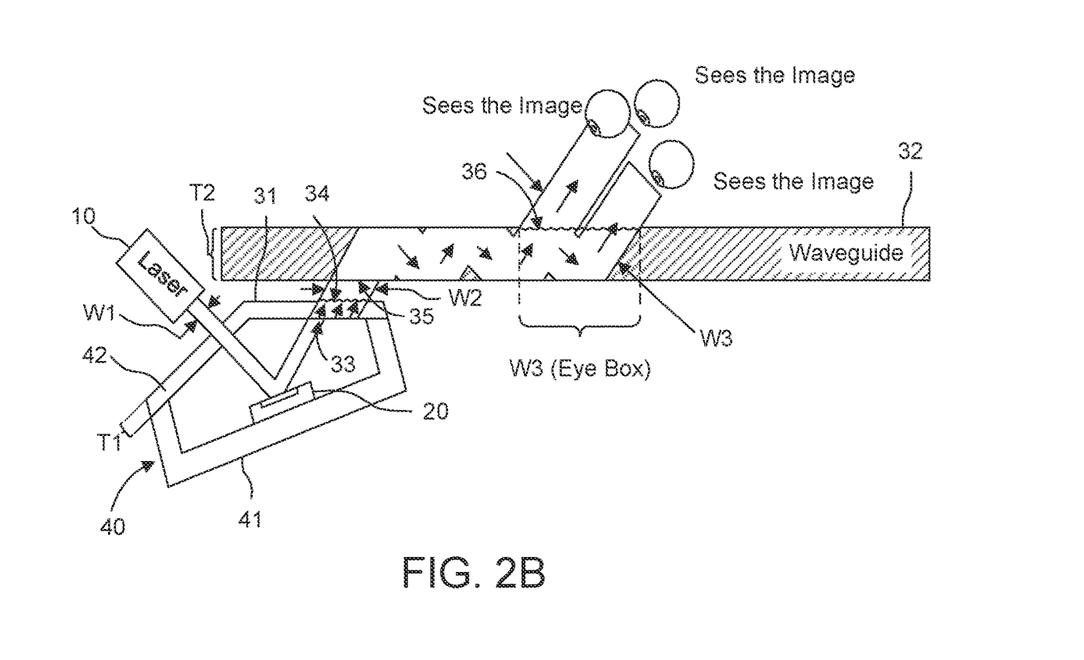

FIG. 2B shows the image projection system 100 further including the 2D MEMS mirror 20 arranged inside a MEMS package 40. The MEMS package 40 includes a housing 41 that includes the first waveguide 31 implemented as a glass cover 42 (i.e., a transparent substrate). The glass cover protects the 2D MEMS mirror 20 from environmental contaminants, such as moisture, dust, and other debris that can impact performance. Accordingly, the first waveguide 31 is integrated in the projection module 110a, 110b as part of the MEMS package 40. Aside from location of the first waveguide 31, the system shown in FIG. 2B is similar to the system shown in FIG. 2A and functions in a similar manner.

The RGB light unit 10 transmits an RGB light beam towards the MEMS mirror 20. On its path to the MEMS mirror 20, the RGB light beam passes through the glass cover 42. The MEMS mirror 20 steers the RGB light beam according to scanning pattern and directs the steered RGB light beam at the first waveguide 31 implemented in the glass cover 42. The first waveguide 31 expands the width of the RGB light beam and outputs an expanded RGB light beam (i.e., a pre-expanded or first expanded RGB light beam) to the second waveguide 32 that is integrated in one of the combiner glasses 130a or 103b. The second waveguide 32 receives and outputs the light beams as described above.

Figure 2C:
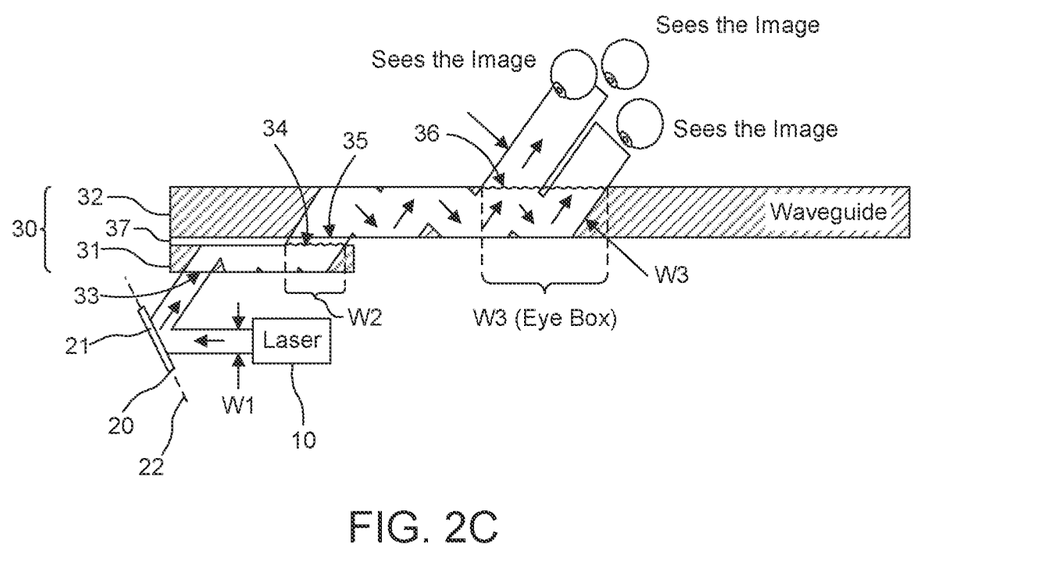

FIG. 2C shows that the cascaded first and second waveguides 31 and 32 can be coupled together. In this case, the first waveguide 31 and the second waveguide 32 are two separate waveguides that are coupled together by a properly defined adhesive layer 37. The adhesive layer 37 may have a lower refractive index than the material of the first and second waveguides 31 and 32 such that the initial RGB light beam can propagate along the first waveguide 31 via internal refraction to the output structure 34. At the output structure 34, the initial RGB light beam is output in multiple instances along the width of the output structure 34 such that a combined output beam (i.e., a pre-expanded RGB light beam) having a width W2 is output by first waveguide 31 to the second waveguide 32. The second waveguide 32 receives and outputs the light beams as described above.

Figure 2D:
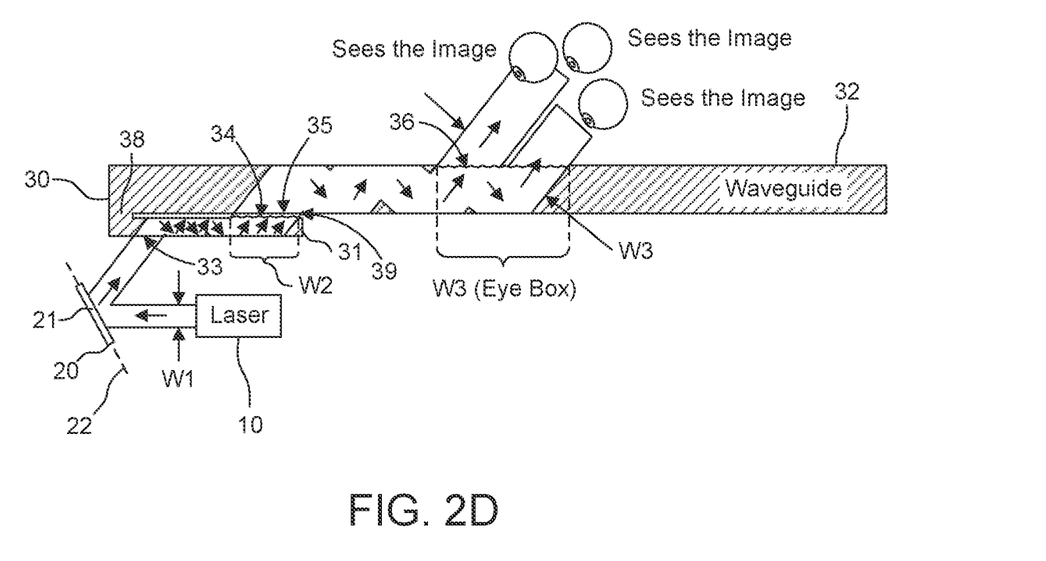

FIG. 2D shows that the cascaded first and second waveguides 31 and 32 can be combined to form a one-piece integral member. In this case, the first and second waveguides 31 and 32 are conjoined by a connecting portion 38 and are separated along a propagation direction of the RGB light beam by a gap 39 (e.g., a slit). The gap 39 may be an air gap or may be filled with a low-refractive index material for stability. The filling material, similar to the adhesive layer 37, has a lower refractive index than the material of the first and second waveguides 31 and 32 such that the initial RGB light beam can propagate along the first waveguide 31 via internal refraction to the output structure 34. The propagating light is confined to the first waveguide 31 until it reaches the output structure 34. At the output structure 34, the initial RGB light beam is output in multiple instances along the width of the output structure 34 such that a combined output beam (i.e., a pre-expanded RGB light beam) having a width W2 is output by first waveguide 31 to the second waveguide 32. The second waveguide 32 receives and outputs the light beams as described above.

Figure 3:
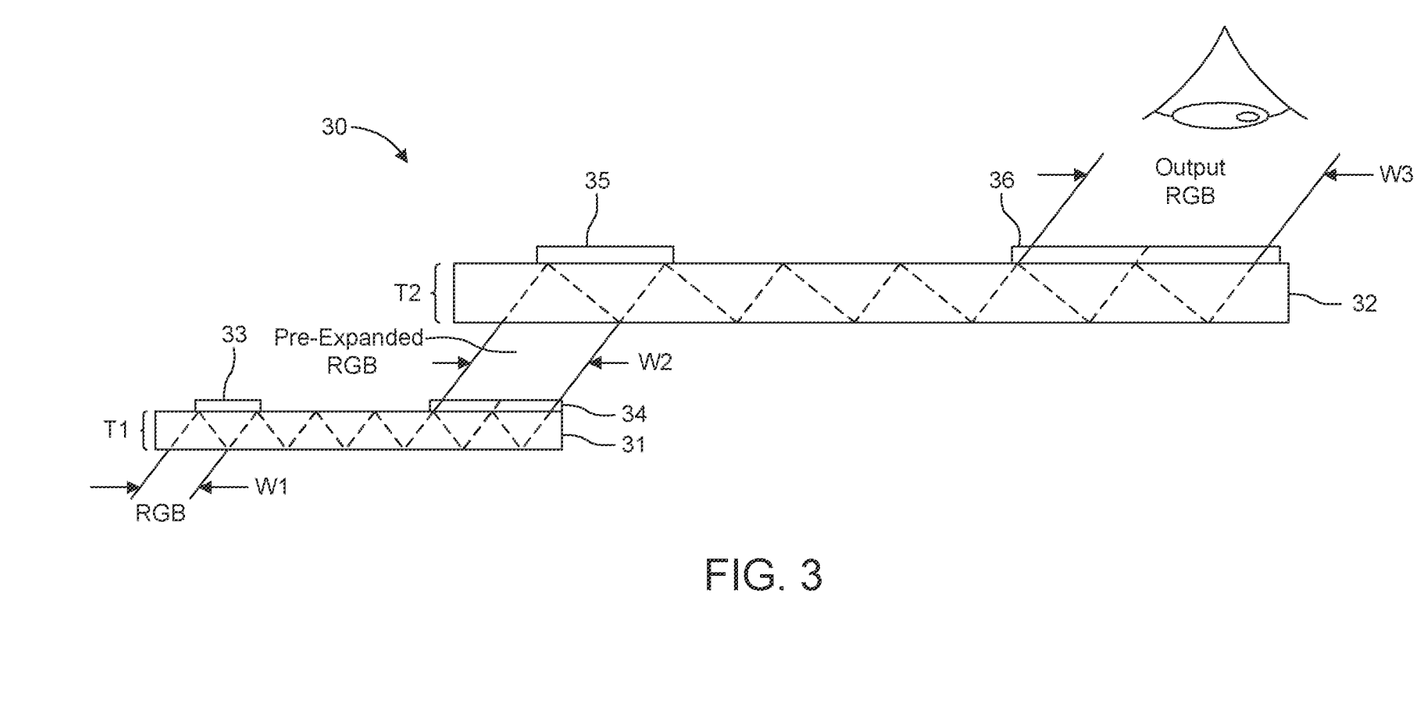
FIG. 3 illustrates a cascaded waveguide of the image projection system according to one or more embodiments.

FIG. 3 illustrates a cascaded waveguide 30 of the image projection system 100 according to one or more embodiments. As described above, the cascaded waveguide 30 includes a first waveguide 31 and a second waveguide 32 each including an input structure and an output structure. It will also be appreciated that the cascaded waveguide 30 may include three or more waveguides arranged in a cascaded arrangement. In this example, the input structures 33 and 35 and the output structures 34 and 36 illustrated in the previous drawings are shown as respective couple-in gratings and couple-out gratings. The waveguides 31 and 32 as shown in FIG. 3 may be used in the arrangements shown in FIGS. 2A-2D.

The MEMS mirror 20 directs the initial RGB light beam having beam width W1 at the first waveguide 31 comprising a couple-in grating 33 and a couple-out grating 34. The couple-in grating 33 couples light (e.g., RGB light) into the waveguide 31. The coupled-in light travels along the waveguide 31 via internal refraction towards the couple-out grating 34, which couples out the light. The couple-out grating 34 projects the coupled-out light towards the second waveguide 32 comprising a couple-in grating 35 and a couple-out grating 36. The couple-in grating 35 couples light (e.g., pre-expanded RGB light) into the waveguide 32. The coupled-in light travels along the waveguide 32 via internal refraction towards the couple-out grating 36, which couples out the light. The couple-out grating 36 projects the coupled-out light into a field of view of a user's eye, and, more particularly, projects the coupled-out light onto the user's eye. Thus, the cascaded waveguide 30 is responsible for coupling in an RGB image formed by RGB light and then projecting the RGB image into an eye of a user by coupling out the RGB image into the field of view of the user's eye. In other words, the cascaded waveguide 30 delivers RGB images generated by the RGB light unit 10 to the user's eye in accordance with the scanning pattern implemented by the MEMS mirror 20.

The above-described embodiments have the additional advantages of not compromising the scan field, no need for diffuser screens, no need to thin the main waveguide (i.e., the second waveguide 32), and provides compact size while filling the eye box of the second waveguide 32.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. An image projection system, comprising:
   a transmitter configured to generate a light beam having a first beam width and transmit the light beam along a transmission path to be projected onto an eye to render a projection image thereon;
   a scanner arranged on the transmission path, the scanner configured to receive the light beam and steer the light beam according to a scanning pattern to render the projection image onto the eye; and
   a cascaded waveguide system comprising a plurality of waveguides arranged sequentially along the transmission path, the plurality of waveguides including a first waveguide and a second waveguide arranged downstream along the transmission path from the first waveguide,
   wherein the first waveguide comprises a first output structure and is configured to receive the light beam from the scanner and output a first expanded light beam at the first output structure,
      wherein the first expanded light beam has a second beam width greater than the first beam width, and
      wherein the first expanded light beam is output via a first side of the first waveguide where the first output structure is configured to be, and
   wherein the second waveguide comprises a second output structure,
      wherein the second waveguide is configured to receive, via a first side of the second waveguide, the first expanded light beam from the first side of the first waveguide and output the first expanded light beam multiple times from the second output structure as a plurality of output light beams via a second side of the second waveguide,
      wherein the second output structure is configured to be on the second side of the second waveguide,
      wherein each of the plurality of output light beams is output from a different area of the second output structure along a propagation direction of the second waveguide, and
      wherein the first waveguide and the second waveguide are conjoined thereby forming a one-piece integral member, wherein a portion of the first waveguide is separated from a portion of the second waveguide by a gap.

2. The image projection system of claim 1, wherein the first output structure is configured to output the light beam multiple times along its propagation dimension as a plurality of overlapping light beams that combine to form the first expanded light beam.

3. The image projection system of claim 2, wherein each of the plurality of overlapping light beams is output from a different area of the first output structure along a propagation direction of the first waveguide.

4. The image projection system of claim 2, wherein the plurality of overlapping light beams are different portions of the light beam received from the scanner.

5. The image projection system of claim 1, wherein the plurality of output light beams overlap to form a second expanded light beam that has a third beam width that is greater than the second beam width.

6. The image projection system of claim 1, wherein the scanner is a microelectromechanical system (MEMS) mirror configured to rotate about at least one scanning axis.

7. The image projection system of claim 1, wherein the transmitter is a red-green-blue (RGB) transmitter comprising at least one red light source, at least one green light source, and at least one blue light source, the light beam in an RGB light beam, and the projection image is an RGB image.

8. The image projection system of claim 1, wherein the plurality of output light beams are different portions of the first expanded light beam received from the first waveguide.

9. The image projection system of claim 1, wherein the first waveguide is thinner than the second waveguide.

10. The image projection system of claim 1, wherein a width of the first output structure extending in a propagation direction of the first waveguide is less than a width of the second output structure extending in a propagation direction of the second waveguide.

11. The image projection system of claim 10, wherein the width of the first output structure is greater than the first beam width.

12. The image projection system of claim 1, wherein:
the scanner is a microelectromechanical system (MEMS) mirror configured to rotate about at least one scanning axis and the image projection system comprises a MEMS package that houses the MEMS mirror,
the MEMS package includes a transparent cover through which the light beam enters the MEMS package from the transmitter and exits the MEMS package from the MEMS mirror, and
the first waveguide is implemented in the transparent cover such that the transparent cover outputs the first expanded light beam via the first waveguide.

13. The image projection system of claim 1, wherein a microelectromechanical system (MEMS) mirror included in the image projection system is a two-dimensional MEMS mirror comprising two scanning axes.

14. The image projection system of claim 1, wherein the gap is an air gap or the gap is filled with a filling material having refractive index that is less than a refractive index of the first and the second waveguides.

15. The image projection system of claim 1, wherein the first waveguide and the second waveguide are coupled together by an adhesive layer, wherein the adhesive layer has a refractive index less than a refractive index of the first waveguide and less than a refractive index of the second waveguide.

16. The image projection system of claim 1, wherein the first output structure is configured to output the light beam multiple times along its propagation dimension as a plurality of light beams with reduced spacing therebetween.

17. A wearable extended reality image projection system, comprising:
a transmitter configured to generate a light beam having a first beam width and transmit the light beam along a transmission path to be projected onto an eye to render a projection image thereon;
a scanner arranged on the transmission path, the scanner configured to receive the light beam and steer the light beam according to a scanning pattern to render the projection image onto the eye; and
a cascaded waveguide system comprising a plurality of waveguides arranged sequentially along the transmission path, the plurality of waveguides including a first waveguide and a second waveguide arranged downstream along the transmission path from the first waveguide,
wherein the first waveguide comprises a first output structure and is configured to receive the light beam from the scanner and output a first expanded light beam at the first output structure,
wherein the first expanded light beam has a second beam width greater than the first beam width, and
wherein the first expanded light beam is output via a first side of the first waveguide where the first output structure is configured to be, and
wherein the second waveguide comprises a second output structure,
wherein the second waveguide is configured to receive, via a first side of the second waveguide, the first expanded light beam from the first side of the first waveguide and output the first expanded light beam multiple times from the second output structure as a plurality of output light beams via a second side of the second waveguide,
wherein the second output structure is configured to be on the second side of the second waveguide,
wherein each of the plurality of output light beams is output from a different area of the second output structure along a propagation direction of the second waveguide, and
wherein the first waveguide and the second waveguide are conjoined thereby forming a one-piece integral member, wherein a portion of the first waveguide is separated from a portion of the second waveguide by a gap.

18. The wearable extended reality image projection system of claim 17, further comprising an eyeglass comprising the cascaded waveguide system.

19. The wearable extended reality image projection system of claim 17, further comprising an eyeglass comprising the second waveguide,
wherein the scanner is a microelectromechanical system (MEMS) mirror configured to rotate about at least one scanning axis and the wearable extended reality image projection system comprises a MEMS package that houses the MEMS mirror,
wherein the MEMS package includes a transparent cover through which the light beam enters the MEMS package from the transmitter and exits the MEMS package from the MEMS mirror, and
the first waveguide is implemented in the transparent cover such that the transparent cover outputs the first expanded light beam via the first waveguide.

20. The wearable extended reality image projection system of claim 17, wherein the first output structure is configured to output the light beam multiple times as plurality of overlapping light beams that combine to form the first expanded light beam.

21. The wearable extended reality image projection system of claim 17, wherein the first output structure is configured to output the light beam multiple times along its propagation dimension as a plurality of light beams with reduced spacing therebetween.

22. The wearable extended reality image projection system of claim 17, wherein the width of the first output structure is greater than the first beam width.

* * * * *